United States Patent
Ueki

(10) Patent No.: US 11,746,569 B2
(45) Date of Patent: Sep. 5, 2023

(54) VEHICLE INCLUDING A WATER DROPLET DETECTOR

(71) Applicant: SUBARU CORPORATION, Tokyo (JP)

(72) Inventor: Takahiro Ueki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 430 days.

(21) Appl. No.: 16/802,355

(22) Filed: Feb. 26, 2020

(65) Prior Publication Data

US 2020/0318399 A1  Oct. 8, 2020

(30) Foreign Application Priority Data

Apr. 3, 2019  (JP) .................. 2019-071107

(51) Int. Cl.
| | |
|---|---|
| *E05B 83/34* | (2014.01) |
| *E05B 77/54* | (2014.01) |
| *E05B 81/64* | (2014.01) |
| *B60R 16/023* | (2006.01) |
| *G07C 5/08* | (2006.01) |
| *G07C 9/00* | (2020.01) |
| *E05B 77/34* | (2014.01) |

(52) U.S. Cl.
CPC ............ *E05B 77/54* (2013.01); *B60R 16/023* (2013.01); *E05B 81/64* (2013.01); *E05B 83/34* (2013.01); *G07C 5/08* (2013.01); *G07C 9/00182* (2013.01); *G07C 2009/00269* (2013.01); *G07C 2009/00277* (2013.01)

(58) Field of Classification Search
CPC .......... E05B 77/34; E05B 83/28; E05B 83/34; E05B 81/64; B60K 15/05; B60K 2015/0507–0592
USPC ...................................... 296/97.22
See application file for complete search history.

(56) References Cited

U.S. PATENT DOCUMENTS

| | | | | |
|---|---|---|---|---|
| 6,313,454 | B1 * | 11/2001 | Bos ......................... | G06V 20/56 |
| | | | | 250/208.1 |
| 7,026,861 | B2 * | 4/2006 | Steenwyk ............... | E05B 81/76 |
| | | | | 307/112 |

(Continued)

FOREIGN PATENT DOCUMENTS

| | | | | |
|---|---|---|---|---|
| CN | 102707340 | A * | 10/2012 | |
| DE | 10316794 | A1 * | 11/2004 | ............ B60S 1/0822 |

(Continued)

*Primary Examiner* — Carlos Lugo
(74) *Attorney, Agent, or Firm* — McGinn I.P. Law Group, PLLC.

(57) ABSTRACT

A vehicle includes a charging lid, a water droplet detector, and a controller. The charging lid is configured to cover a charging port of an inlet in an openable and closable manner. The water droplet detector is configured to detect water droplets on the vehicle. The controller is configured to release a lock of the charging lid when an access key configured to wirelessly communicate with the vehicle and provide an instruction to lock or unlock a door of the vehicle is present near the vehicle or when an unlock condition for keeping the door unlocked is satisfied. The controller is configured to, in response to the water droplet detector detecting water droplets, lock the charging lid in a closed state, regardless of whether the unlock condition is satisfied.

12 Claims, 3 Drawing Sheets

(56) References Cited

U.S. PATENT DOCUMENTS

| | | | | |
|---|---|---|---|---|
| 7,259,367 | B2 * | 8/2007 | Reime | B60S 1/0822 |
| | | | | 250/221 |
| 7,646,889 | B2 * | 1/2010 | Tsukamoto | B60S 1/0844 |
| | | | | 382/104 |
| 8,376,416 | B2 * | 2/2013 | Arabia, Jr. | E05B 81/86 |
| | | | | 292/201 |
| 8,720,968 | B2 * | 5/2014 | Zalan | B60L 53/16 |
| | | | | 296/97.22 |
| 9,663,127 | B2 * | 5/2017 | Palmer | B61L 15/0072 |
| 10,043,364 | B2 * | 8/2018 | Garcia | G08B 21/0202 |
| 2005/0099263 | A1 * | 5/2005 | Ikeda | E05B 77/48 |
| | | | | 340/426.36 |
| 2015/0306940 | A1 * | 10/2015 | Salter | B60H 1/00742 |
| | | | | 701/49 |

FOREIGN PATENT DOCUMENTS

| | | | | |
|---|---|---|---|---|
| DE | 102005052635 A1 * | 5/2007 | | B60K 28/12 |
| DE | 102017107017 A1 * | 10/2017 | | B60K 15/0409 |
| EP | 290106 A * | 11/1988 | | B60J 7/0573 |
| EP | 854060 A2 * | 7/1998 | | B60J 5/06 |
| JP | 57066014 A * | 4/1982 | | |
| JP | 2018-052329 A | 4/2018 | | |
| KR | 20080043089 A * | 5/2008 | | |
| KR | 101875437 B1 * | 7/2018 | | |
| WO | WO-2013041081 A2 * | 3/2013 | | B60K 15/05 |

\* cited by examiner

FIG. 4 is a flowchart illustrating the operation of a controller.

VEHICLE INCLUDING A WATER DROPLET DETECTOR

CROSS-REFERENCE TO RELATED APPLICATIONS

The present application claims priority from Japanese Patent Application No. 2019-071107 filed on Apr. 3, 2019, the entire contents of which are hereby incorporated by reference.

BACKGROUND

The disclosure relates to a vehicle.

Japanese Unexamined Patent Application Publication No. 2018-52329 discloses a technique for supplying air to a charging port of an inlet in a vehicle such as an electric vehicle. In this technique, the supply of air to the charging port can prevent rainwater from entering the charging port.

SUMMARY

An aspect of the disclosure provides a vehicle including a charging lid, a water droplet detector, and a controller. The charging lid is configured to cover a charging port of an inlet in an openable and closable manner. The water droplet detector is configured to detect water droplets on the vehicle. The controller is configured to release a lock of the charging lid when an access key configured to wirelessly communicate with the vehicle and provide an instruction to lock or unlock a door of the vehicle is present near the vehicle or when an unlock condition for keeping the door unlocked is satisfied. The controller is configured to, in response to the water droplet detector detecting water droplets, lock the charging lid in a closed state, regardless of whether the unlock condition is satisfied.

An aspect of the disclosure provides a vehicle including a charging lid, a water droplet detector, and circuitry. The charging lid is configured to cover a charging port of an inlet in an openable and closable manner. The water droplet detector is configured to detect water droplets on the vehicle. The circuitry is configured to release a lock of the charging lid when an access key configured to wirelessly communicate with the vehicle and provide an instruction to lock or unlock a door of the vehicle is present near the vehicle or when an unlock condition for keeping the door unlocked is satisfied. The circuitry is configured to, in response to the water droplet detector detecting water droplets, lock the charging lid in a closed state, regardless of whether the unlock condition is satisfied.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
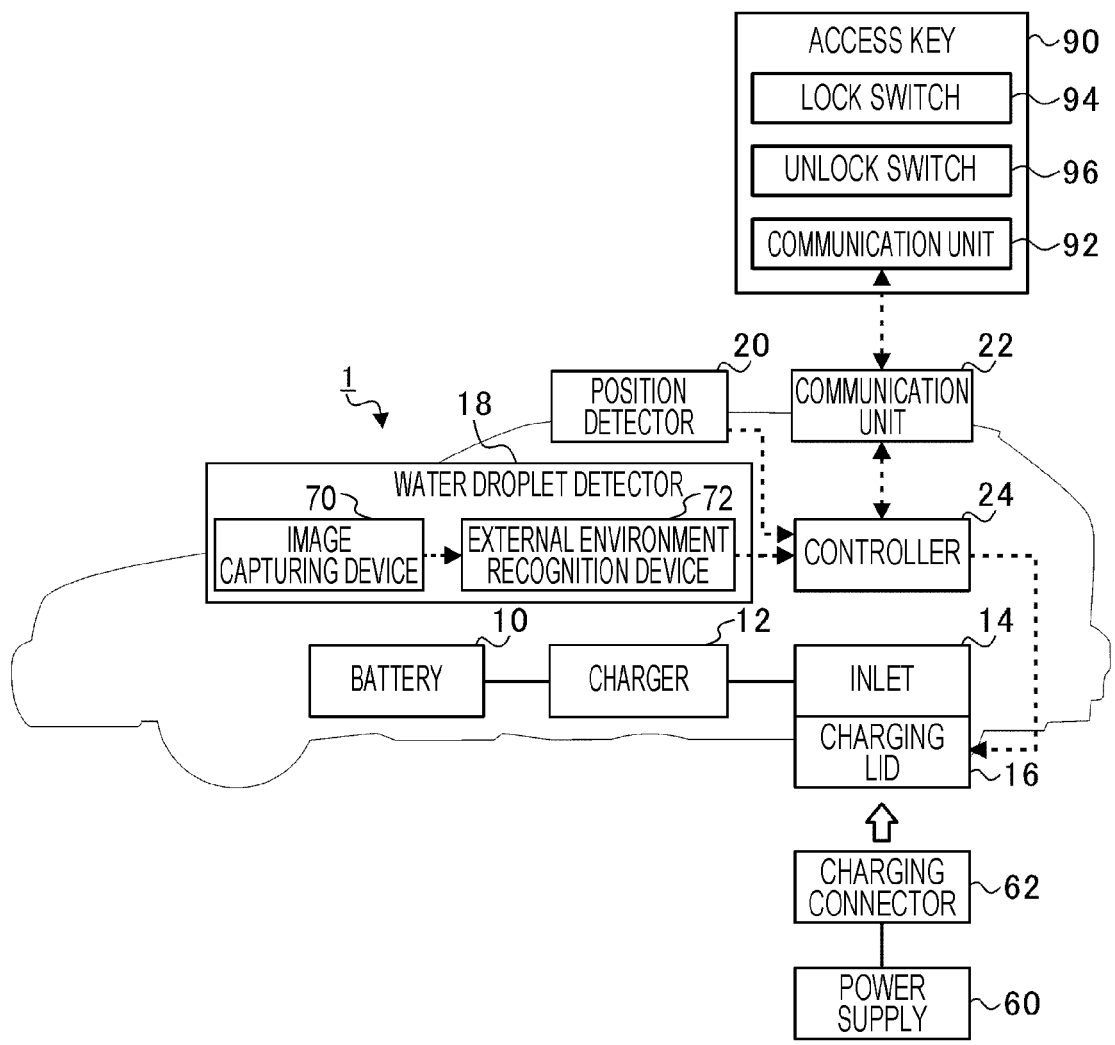
FIG. 1 is a schematic diagram illustrating a configuration of a vehicle according to an embodiment of the disclosure and its peripherals.

An inlet has a charging lid that covers a charging port to prevent dust, sand, and water from entering the charging port. When an access key is present near the vehicle or when the doors of the vehicle remain unlocked, the charging lid is unlocked for convenience. The charging lid has an opening that is opened when a force is applied from outside when the charging lid remains unlocked.

A passenger of a vehicle sometimes washes the vehicle using a vehicle washing machine or the like, with the access key near the vehicle or with the doors unlocked. In this case, if a force is applied to the charging lid by a brush or the like of the vehicle washing machine, the opening may be opened since the charging lid is in an unlocked position. If the opening is opened during washing, wash water enters the charging lid, which may cause electric leakage during charging or the like.

It is desirable to provide a vehicle capable of preventing water from entering a charging lid during washing.

The following describes an embodiment of the disclosure in detail with reference to the accompanying drawings. The dimensions, materials, and other specific values provided in the embodiment are employed for illustrative purposes only to facilitate understanding of the disclosure and are not intended to limit the disclosure unless otherwise noted. In the specification and the drawings, elements having substantially the same functions and configurations are identified by the same numerals to avoid repetition of description. In addition, elements not directly related to the disclosure are not illustrated in the drawings.

FIG. 1 is a schematic diagram illustrating a configuration of a vehicle 1 according to the embodiment of the disclosure and its peripherals. In FIG. 1, the flow of a control signal is indicated by a broken-line arrow. In the following, the configurations and processes related to this embodiment will be described in detail, whereas the configurations and processes not related to this embodiment will not be described.

For example, the vehicle 1 is an electric vehicle that uses a motor (not illustrated) as a drive source. The vehicle 1 may be a hybrid electric vehicle in which an engine and a motor are disposed in parallel to each other. The vehicle 1 includes a battery 10, a charger 12, an inlet 14, a charging lid 16, a water droplet detector 18, a position detector 20, a communication unit 22, and a controller 24.

The battery 10 is a secondary battery such as a lithium ion battery. In the vehicle 1, the power of the battery 10 is consumed to drive the motor. The charger 12 is coupled to the battery 10 and the inlet 14. The charger 12 receives alternating current (AC) power from outside the vehicle 1 through the inlet 14, converts the received AC power into direct current (DC) power, and supplies the DC power to the battery 10. That is, the battery 10 is charged via the charger 12 and the inlet 14. For example, the inlet 14 is disposed in the rear on one side surface of the vehicle 1.

Figure 2:
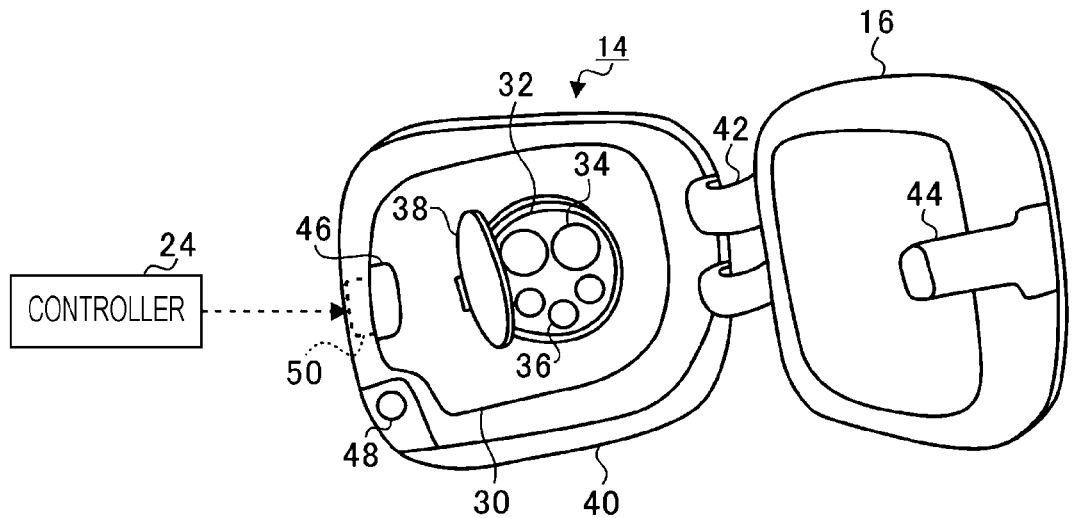
FIG. 2 is a schematic diagram illustrating a configuration of an inlet.

FIG. 2 is a schematic diagram illustrating a configuration of the inlet 14. The inlet 14 includes a case 30, a charging port 32, power terminals 34, communication terminals 36, and a cover 38.

The case 30 is formed of an insulator, for example, and is supported on the inner side of the body of the vehicle 1. The case 30 is a container recessed toward the inside of the vehicle 1. The case 30 has the charging port 32. The charging port 32 has the power terminals 34 and the communication terminals 36. The charging port 32 also has the cover 38 that covers the power terminals 34 and the communication terminals 36.

For example, two power terminals 34 and a plurality of (in FIG. 2, three) communication terminals 36 are disposed. The power terminals 34 and the communication terminals 36 are each formed of a cylindrical conductor having a circumferential surface covered with an insulator. The power terminals 34 and the communication terminals 36 function as female coupling terminals. The power terminals 34 are coupled to power lines extending from the charger 12, and the communication terminals 36 are coupled to communication lines extending from the controller 24 or the like.

The body of the vehicle 1 has an opening 40 in front of the charging port 32. The opening 40 communicates between the space in the case 30 of the inlet 14 and the outside of the vehicle 1. The charging lid 16 is placed over the opening 40 to cover the charging port 32 of the inlet 14. The charging lid 16 is pivotable about a hinge 42 as a fulcrum so that the opening 40 can be opened or closed. The charging lid 16 is closed during non-charging periods and is opened when charging is started. In FIG. 2, the charging lid 16 is illustrated in the opened position.

The charging lid 16 has a hook 44 on the side opposite to the hinge 42. The body has a latch 46, which corresponds to the hook 44, and an opening and closing switch 48. When the opening and closing switch 48 is pressed by the charging lid 16 when the charging lid 16 is in the opened position, the hook 44 is engaged in the latch 46, so that the opening 40 is closed by the charging lid 16. When the hook 44 side of the charging lid 16 (above the opening and closing switch 48) is pressed from the outside when the charging lid 16 is in the closed position, the hook 44 is disengaged from the latch 46, so that the opening 40 is opened by the charging lid 16.

A lock mechanism 50 is disposed near the latch 46. The lock mechanism 50 locks and unlocks the charging lid 16 when the charging lid 16 is in the closed position.

Upon receipt of a lid lock signal from the controller 24 to lock the charging lid 16, the lock mechanism 50 locks the charging lid 16. For example, the lock mechanism 50 holds the latch 46 so as not to disengage the hook 44 from the latch 46 even if the opening and closing switch 48 is pressed. The charging lid 16, when locked, can maintain the opening 40 in the closed state even if a force is applied from outside.

Upon receipt of a lid unlock signal from the controller 24 to unlock the charging lid 16, the lock mechanism 50 unlocks the charging lid 16. For example, the lock mechanism 50 releases the holding of the latch 46. The charging lid 16, when unlocked, enables the opening 40 to be opened. In response to a force being applied from outside, the charging lid 16 opens the opening 40.

Referring back to FIG. 1, the peripherals of the vehicle 1 include a power supply 60 and a charging connector 62. For example, the power supply 60 is charging equipment coupled to a commercial power supply. The power supply 60 supplies power to the vehicle 1, and the supplied power is used to charge the battery 10. The power supply 60 may be a commercially available charging stand or may be a home-use charging device or the like.

The charging connector 62 is coupled to the power supply 60 through a cable. As indicated by a hollow arrow, the charging connector 62 is capable of being coupled to the charging port 32 of the inlet 14 through the charging lid 16. For example, the charging connector 62 has male power terminals capable of being coupled to the power terminals 34, and male communication terminals capable of being coupled to the communication terminals 36. When the charging connector 62 is coupled to the charging port 32, the power terminals 34 are electrically coupled to the male power terminals, and the communication terminals 36 are electrically coupled to the male communication terminals. The vehicle 1 receives power from the power supply 60 via the electrically coupled power terminals 34. Further, the vehicle 1 is capable of communicating with the power supply 60 via the electrically coupled communication terminals 36.

The water droplet detector 18 includes an image capturing device 70 and an external environment recognition device 72. The image capturing device 70 includes an image capturing element such as a charge-coupled device (CCD) element or a complementary metal-oxide semiconductor (CMOS) element. The image capturing device 70 is disposed in the passenger compartment of the vehicle 1 in such a manner that the optical axis of the image capturing device 70 is oriented in the direction of movement of the vehicle 1. The image capturing device 70 is capable of capturing an image of a glass surface of the vehicle 1, such as the windshield surface, and an image of a scene outside the vehicle 1 through the glass surface of the vehicle 1.

The image capturing device 70 captures images of a target object present in a detection area ahead of the vehicle 1 and consecutively generates brightness images including at least information on brightness for each predetermined frame. In this embodiment, the target object mainly captured by the image capturing device 70 is water droplets on a glass surface of the vehicle 1, for example. The target object is not limited to water droplets on a glass surface and may be foam or the like.

The external environment recognition device 72 recognizes water droplets on a glass surface during washing of the vehicle 1 on the basis of a plurality of brightness images captured at different times, which are generated by the image capturing device 70.

The vehicle 1 may not include two image capturing devices 70, and may include at least one image capturing device 70. That is, since the external environment recognition device 72 according to this embodiment is configured to recognize water droplets from brightness images, no parallax information or distance image may be generated. When the vehicle 1 includes two image capturing devices 70, the external environment recognition device 72 may recognize water droplets from brightness images obtained by one of the image capturing devices 70.

Figure 3A:
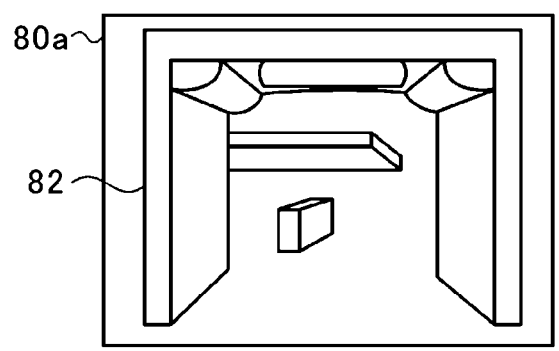
FIGS. 3A and 3B illustrate water droplets during washing of the vehicle.
Figure 3B:
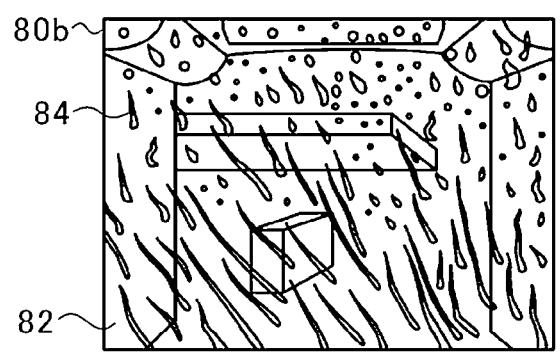

FIGS. 3A and 3B illustrate water droplets during washing of the vehicle 1. FIG. 3A illustrates an example of a brightness image 80a captured immediately before washing, and FIG. 3B illustrates an example of a brightness image 80b captured during washing. It is assumed here that the passenger of the vehicle 1 washes the vehicle 1 using a vehicle washing machine 82, which is installed in a service station or the like.

As illustrated in FIG. 3A, the vehicle washing machine 82 appears in the brightness image 80a captured immediately before washing. Since the vehicle washing machine 82 does not start the washing operation, there is no water droplet sticking to the glass surface of the vehicle 1. Accordingly, no water droplet appears in the brightness image 80a.

When the washing operation is started, water is sprayed onto the vehicle 1 from the vehicle washing machine 82. That is, water droplets 84 stick to the glass surface of the vehicle 1. Accordingly, as illustrated in FIG. 3B, the water droplets 84 appear in the brightness image 80b captured during washing.

During washing, the water droplets 84 stick to the glass surface and run down substantially vertically along the glass surface. Accordingly, as illustrated in FIG. 3B, the brightness image 80b shows not only drops of water droplets 84 but also streaks of water droplets 84, which indicate trails of water droplets 84 running slowly or quickly.

For example, when the percentage of drops of target objects and streaks of target objects in the brightness image 80b is greater than or equal to a predetermined value, the external environment recognition device 72 identifies the target objects as the water droplets 84 generated during washing. The predetermined value is 50%, for example, and is determined in advance through experiment or the like.

For example, when the vehicle 1 is moving in rain, the wind or the like lifts raindrops hitting the windshield upward substantially vertically. During washing of the vehicle 1, in contrast, the water droplets 84 hitting the windshield run down the windshield substantially vertically.

Accordingly, the external environment recognition device 72 distinguishes between the water droplets 84 resulting from rain and the water droplets 84 generated during washing in accordance with the identified direction in which the water droplets 84 run. For example, the external environment recognition device 72 chronologically compares a plurality of brightness images 80b captured at different times, and derives the direction in which the water droplets 84 run. When the water droplets 84 run down substantially vertically, the external environment recognition device 72 recognizes the water droplets 84 caused during washing of the vehicle 1.

Upon recognition of the water droplets 84 in the way described above, the external environment recognition device 72 transmits to the controller 24 a water droplet detection signal indicating detection of the water droplets 84.

Referring back to FIG. 1, the position detector 20 is, for example, a Global Positioning System (GPS) detector. The position detector 20 obtains the current position of the vehicle 1. The communication unit 22 is capable of establishing wireless communication with an external device to transmit and receive various kinds of information to and from the external device.

The peripherals of the vehicle 1 also include an access key 90. The access key 90 is assumed to be carried by the passenger of the vehicle 1. The access key 90 includes a communication unit 92, a lock switch 94, and an unlock switch 96.

The communication unit 92 is capable of establishing wireless communication with the communication unit 22 of the vehicle 1. The communication unit 92 is capable of establishing communication within a relatively small area. That is, the communication unit 92 is capable of establishing communication with the communication unit 22 in a location relatively near the vehicle 1, but is no longer capable of establishing communication with the communication unit 22 in a location away from the vehicle 1.

The lock switch 94 accepts an operation of the passenger who locks the doors of the vehicle 1. When the lock switch 94 is pressed, the communication unit 92 transmits a door lock signal to the vehicle 1 to provide an instruction to lock the doors of the vehicle 1.

The unlock switch 96 accepts an operation of the passenger who unlocks the doors of the vehicle 1. When the unlock switch 96 is pressed, the communication unit 92 transmits a door unlock signal to the vehicle 1 to provide an instruction to unlock the doors of the vehicle 1.

That is, the access key 90 wirelessly communicates with the vehicle 1 to provide an instruction to lock or unlock the doors. When the access key 90 is not present near the vehicle 1, the communication unit 92 of the access key 90 fails to establish communication with the communication unit 22 of the vehicle 1, and accordingly neither a door lock signal nor a door unlock signal is effectively transmitted.

The controller 24 is constituted by a semiconductor integrated circuit including a central processing unit (CPU), a read-only memory (ROM) that stores programs and so on, a random access memory (RAM) serving as a work area, and so on.

When the vehicle 1 is not in use, such as when parked, the controller 24 keeps the charging lid 16 locked. In a situation where the charging lid 16 is in a locked state, when the access key 90 is present near the vehicle 1 or when an unlock condition for keeping the door unlocked is satisfied, the controller 24 releases the lock of the charging lid 16. For example, the controller 24 transmits a lid unlock signal to the lock mechanism 50. Upon receipt of the lid unlock signal, the lock mechanism 50 unlocks the charging lid 16.

When the water droplet detector 18 detects the water droplets 84, the controller 24 locks the charging lid 16 in the closed state, regardless of whether the unlock condition is satisfied. For example, the controller 24 transmits a lid lock signal to the lock mechanism 50. Upon receipt of the lid lock signal, the lock mechanism 50 locks the charging lid 16.

The controller 24 releases the lock of the charging lid 16 when the access key 90 is present near the vehicle 1 and a door unlock signal is received from the access key 90 to provide an instruction to unlock the doors while the charging lid 16 remains locked on the basis of the detection of the water droplets 84.

Further, the controller 24 obtains position information indicating the current position of the vehicle 1 from the position detector 20. When the current position of the vehicle 1 matches a position at which washing is to take place, the controller 24 sets the water droplet detector 18 to a water droplet detection mode. The position at which washing is to take place is hereinafter referred to sometimes as a washable position. For example, the washable position is a position at which the vehicle washing machine 82 is installed. The water droplet detection mode is a control mode for enabling the water droplet detector 18 to detect the water droplets 84.

The passenger of the vehicle 1 sometimes turns off the ignition of the vehicle 1 (IG-OFF) during washing. If IG-OFF occurs, typically, no power is supplied to the water droplet detector 18. In this case, the water droplet detector 18 may not be able to detect the water droplets 84 during washing.

To address this situation, when the vehicle 1 is located at the washable position, the controller 24 sets the water droplet detector 18 to the water droplet detection mode so that power is supplied to the water droplet detector 18 even if the ignition of the vehicle 1 is turned off (IG-OFF). This enables the water droplet detector 18 to detect the water droplets 84 even if IG-OFF occurs during washing.

When the water droplet detector 18 detects the water droplets 84 in the water droplet detection mode, the controller 24 may lock the charging lid 16 and terminate the water droplet detection mode. That is, the controller 24 may finish supply of power to the water droplet detector 18 if the ignition of the vehicle 1 has been turned off (IG-OFF has occurred) when the charging lid 16 is locked. This can reduce the power consumed by the water droplet detector 18.

Further, the controller 24 may terminate the water droplet detection mode when the vehicle 1 is moved away from the washable position. That is, when the vehicle 1 is located at a position other than the washable position, the controller 24 finishes supply of power to the water droplet detector 18 in response to the turn-off of the ignition of the vehicle 1 (IG-OFF). This can reduce the power consumed by the water droplet detector 18.

Figure 4:
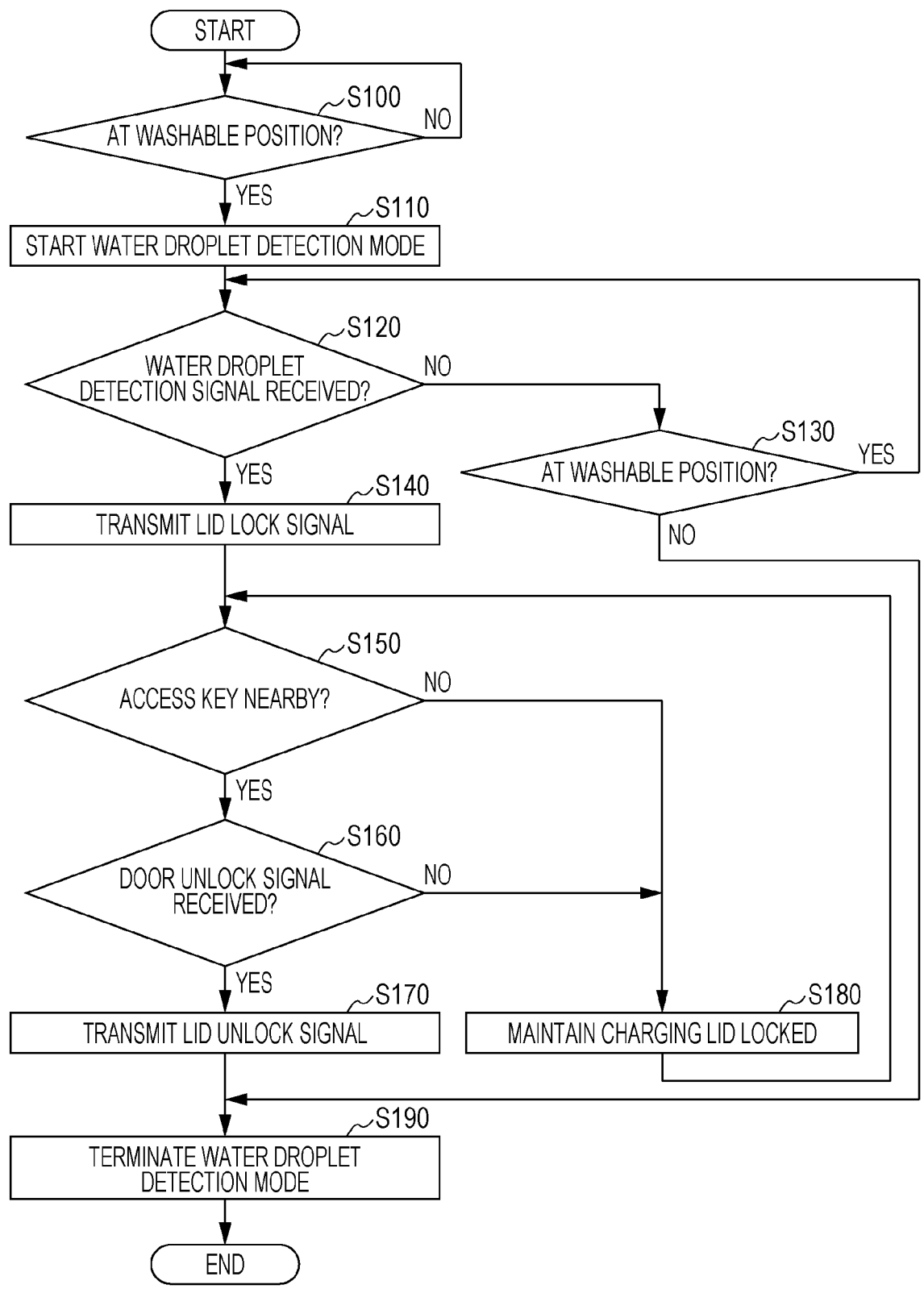

FIG. 4 is a flowchart illustrating the operation of the controller 24. The controller 24 starts a series of processing operations illustrated in FIG. 4 when the ignition of the vehicle 1 is turned on (IG-ON).

First, the controller 24 determines whether the vehicle 1 is currently at the washable position (S100). For example, the controller 24 obtains position information indicating the current position of the vehicle 1 from the position detector 20. The washable position is stored in advance in the controller 24 in association with map information. The controller 24 determines whether the position identified by the obtained position information matches the washable position.

If the vehicle 1 is not at the washable position (NO in S100), the controller 24 waits for the vehicle 1 to be located at the washable position.

If the vehicle 1 is at the washable position (YES in S100), the controller 24 starts the water droplet detection mode (S110). That is, the controller 24 causes power to be supplied to the water droplet detector 18 even if the ignition of the vehicle 1 is turned off (IG-OFF).

Then, the controller 24 determines whether a water droplet detection signal indicating that the water droplets 84 have been detected has been received from the water droplet detector 18 (S120). If the water droplet detection signal has not been received (NO in S120), the controller 24 determines whether the current position of the vehicle 1 matches the washable position (S130).

If the vehicle 1 is not at the washable position (NO in S130), the controller 24 determines that the vehicle 1 was placed at the washable position, but has moved away from the washable position without being washed, and terminates the water droplet detection mode (S190). Then, the series of processing operations ends.

If the vehicle 1 is at the washable position (YES in S130), the process returns to the processing of step S120, and the controller 24 determines whether the water droplet detection signal has been received. That is, the controller 24 repeatedly performs the processing of steps S120 and S130 and waits until the water droplets 84 are detected or until the vehicle 1 moves away from the washable position without being washed.

If the water droplet detection signal has been received (YES in S120), the controller 24 transmits a lid lock signal to the lock mechanism 50 (S140). Accordingly, the charging lid 16 is not opened even if a force is applied from outside. This can prevent the water droplets 84 from entering the charging lid 16 during washing of the vehicle 1.

Then, the controller 24 determines whether the access key 90 is present near the vehicle 1 (S150). For example, if the communication unit 22 has successfully established communication with the access key 90, the controller 24 determines that the access key 90 is present near the vehicle 1. If the communication unit 22 has failed to establish communication with the access key 90, the controller 24 determines that the access key 90 is not present near the vehicle 1.

If the access key 90 is present near the vehicle 1 (YES in S150), the controller 24 determines whether a door unlock signal has been received from the access key 90 (S160).

If a door unlock signal has been received (YES in S160), the controller 24 transmits a lid unlock signal to the lock mechanism 50 (S170), and terminates the water droplet detection mode (S190). Then, the series of processing operations ends. Accordingly, the lock of the charging lid 16 is released, and the opening 40 can be opened when a force is applied from outside.

If the access key 90 is not present near the vehicle 1 (NO in S150) or if a door unlock signal has not been received (NO in S160), the controller 24 maintains the charging lid 16 locked (S180). Then, the process returns to the processing of step S150. That is, the charging lid 16 is maintained in a locked state until the access key 90 is present near the vehicle 1 and a door unlock signal is received.

As described above, in the vehicle 1 according to this embodiment, when the water droplet detector 18 detects the water droplets 84, the charging lid 16 is locked in a closed state. In the vehicle 1 according to this embodiment, accordingly, even if a force is applied to the charging lid 16 from outside such as with a brush of a vehicle washing machine, the opening 40 can be maintained in a closed state.

In the vehicle 1 according to this embodiment, even if the access key 90 is present near the vehicle 1, it is possible to prevent water from entering the charging lid 16 during washing of the vehicle 1. In the vehicle 1 according to this embodiment, therefore, it is possible to prevent electric leakage even if charging is performed after washing of the vehicle 1.

In the vehicle 1 according to this embodiment, furthermore, when the access key 90 is present near the vehicle 1 and a door unlock signal is received, the lock of the charging lid 16 is released (i.e., the charging lid 16 is unlocked). In the vehicle 1 according to this embodiment, therefore, it is possible to open the charging lid 16 to charge the battery 10 after the vehicle 1 has been washed.

In the vehicle 1 according to this embodiment, furthermore, the water droplets 84 are detected using an image captured by the image capturing device 70 mounted in the vehicle 1. In this embodiment, since the movement direction of the water droplets 84 can be recognized, the water droplets 84 generated during washing and the water droplets 84 resulting from rain can be distinctly identified from each other. In the vehicle 1 according to this embodiment, therefore, the water droplets 84 generated during washing of the vehicle 1 can be detected distinguishably from the water droplets 84 resulting from rain.

In the case of rain, a force is less likely to be applied to the charging lid 16 from outside than during washing of the vehicle 1. In the case of rain, accordingly, the charging lid 16 may not be locked.

In the vehicle 1 according to this embodiment, furthermore, when the vehicle 1 is located at the washable position, the water droplet detector 18 is enabled to detect the water droplets 84. For example, the controller 24 causes power to be supplied to the water droplet detector 18 even if the ignition of the vehicle 1 is turned off (IG-OFF). Accordingly, in the vehicle 1 according to this embodiment, the water droplets 84 can be more reliably detected in a situation where the vehicle 1 is likely to be washed. The vehicle 1 can be washed, as appropriate, with the charging lid 16 kept in a locked state.

In addition, when the water droplets 84 are detected in a situation where the vehicle 1 is located at the washable position, the detected water droplets 84 are likely to be the water droplets 84 generated during washing. In the vehicle 1 according to this embodiment, accordingly, the water droplets 84 generated during washing of the vehicle can be detected distinguishably from the water droplets 84 resulting from rain.

The water droplet detector 18 may not necessarily be configured to detect the water droplets 84 on the basis of an image. For example, the water droplet detector 18 may detect the water droplets 84 using an optical sensor used in an automatic wiper system or the like. The optical sensor may apply infrared radiation to a glass surface and detect the water droplets 84 using the intensity of the reflected light.

While an embodiment of the disclosure has been described with reference to the accompanying drawings, it goes without saying that the disclosure is not limited to the embodiment. It is to be understood that a person skilled in the art can make various changes or modifications within the scope as defined in the appended claims and that such changes or modifications also fall within the technical scope of the disclosure.

The controller 24 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 24. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle comprising:
a charging lid configured to cover a charging port of an inlet in an openable and closable manner;
a droplet detector configured to detect droplets including water or foam on a glass surface of the vehicle, the droplet detector comprising an image capturing device; and
a controller configured to release a lock of the charging lid when an access key configured to wirelessly communicate with the vehicle and provide an instruction to lock or unlock a door of the vehicle is present near the vehicle or when an unlock condition for keeping the door unlocked is satisfied,
wherein the droplet detector is configured to:
obtain images in which the droplets are captured at different times with the image capturing device; and
identify one or more directions in which the droplets on the glass surface run based on the captured images, and
wherein the controller is configured to, based on the one or more directions in which the droplets on the glass surface run, lock the charging lid in a closed state, regardless of whether the unlock condition is satisfied, and
wherein the controller is configured to:
release the lock of the charging lid when the droplet detector determines that the droplets run upward substantially vertically; and
lock the charging lid in the closed state when the droplet detector determines that the droplets run down substantially vertically.

2. The vehicle according to claim 1, wherein the controller is configured to release the lock of the charging lid when the access key is present near the vehicle and a door unlock signal is received from the access key to provide an instruction to unlock the door while the charging lid remains locked on a basis of detection of the droplets.

3. The vehicle according to claim 1, wherein the controller is configured to obtain position information indicating a position of the vehicle and to enable the droplet detector to detect the droplets when the vehicle is at a position at which washing is to take place.

4. The vehicle according to claim 2, wherein the controller is configured to obtain position information indicating a position of the vehicle and to enable the droplet detector to detect the droplets when the vehicle is at a position at which washing is to take place.

5. The vehicle according to claim 1, wherein the charging port is sealed from the water droplets while in the closed state.

6. The vehicle according to claim 1, wherein the charging lid is configured to be opened and closed via a normal opening force applied from an outside to the charging lid,
wherein, in response to the droplet detector detecting the droplets, the closed state is maintained even when the normal opening force is applied to the charging lid from outside.

7. The vehicle according to claim 1, wherein the droplet detector detects the droplets contacting a separate part of the vehicle than the charging lid.

8. The vehicle according to claim 1, wherein the droplet detector consists of a single image capturing device that obtains the images, and
wherein the droplet detector includes an external environment recognition device configured to recognize the droplets on the glass surface of the vehicle on a basis of a plurality of brightness images captured at the different times, which are generated by the image capturing device.

9. The vehicle according to claim 1, wherein the controller is configured to:
obtain position information indicating a current position of the vehicle; and
cause the droplet detector to begin to detect the droplets, based on determining that the vehicle is at a position at which washing is allowed to take place based on the position information.

10. A vehicle comprising:
a charging lid configured to cover a charging port of an inlet in an openable and closable manner;
a detector configured to detect droplets including water or foam on a glass surface of the vehicle, the droplet detector comprising an image capturing device; and
circuitry configured to
release a lock of the charging lid when an access key configured to wirelessly communicate with the vehicle and provide an instruction to lock or unlock a door of the vehicle is present near the vehicle or when an unlock condition for keeping the door unlocked is satisfied, wherein the detector is configured to:
obtain images captured at different times with the image capturing device; and
identify one or more directions in which the droplets on the glass surface run based on the captured images, and wherein the circuitry is configured to, based on the one or more directions in which the droplets on the glass surface run, lock the charging lid in a closed state, regardless of whether the unlock condition is satisfied, and wherein the circuitry is configured to:
  release the lock of the charging lid when the detector determines that the droplets run upward substantially vertically, and
  lock the charging lid in the closed state when the detector determines that the droplets run down substantially vertically.

11. The vehicle according to claim 10, wherein the droplet detector consists of a single image capturing device that obtains the images, and
  wherein the droplet detector includes an external environment recognition device configured to recognize the droplets on the glass surface of the vehicle on a basis of a plurality of brightness images captured at the different times, which are generated by the image capturing device.

12. The vehicle according to claim 10, wherein the circuitry is configured to:
  obtain position information indicating a current position of the vehicle; and
  cause the droplet detector to begin to detect the droplets, based on determining that the vehicle is at a position at which washing is allowed to take place based on the position information.

* * * * *